United States Patent [19]
Sitter

[11] 4,108,156
[45] Aug. 22, 1978

[54] SOLAR-HEATED STOCK TANK
[75] Inventor: Spencer B. Sitter, Santa Fe, N. Mex.
[73] Assignee: Jay Taylor, Amarillo, Tex.
[21] Appl. No.: 773,486
[22] Filed: Mar. 2, 1977
[51] Int. Cl.² .................................................. F24J 3/02
[52] U.S. Cl. ...................................... 126/271; 119/73
[58] Field of Search .................... 119/73; 126/270, 271, 126/400

[56] References Cited

U.S. PATENT DOCUMENTS

| | | | |
|---|---|---|---|
| 2,167,576 | 7/1939 | Kiser | 126/271 |
| 3,161,193 | 12/1964 | Rowekamp | 126/271 |
| 3,618,569 | 11/1971 | Baer | 119/73 |
| 3,892,433 | 7/1975 | Blake | 126/270 |

FOREIGN PATENT DOCUMENTS

| | | | |
|---|---|---|---|
| 621,392 | 2/1927 | France | 126/271 |
| 820,705 | 8/1937 | France | 126/271 |
| 442,163 | 2/1948 | Italy | 126/271 |

*Primary Examiner*—Carroll B. Dority, Jr.
*Attorney, Agent, or Firm*—Wendell Coffee

[57] ABSTRACT

A heated stock tank with insulated walls and a drinking trough on a side is surrounded by a larger stock tank to protect it from livestock. The heated stock tank has a steel plate above the water. Copper tubes depending from the plate are immersed in the water within the heated tank. A transparent covering is over the heated tank. A vertically oriented mirror is mounted on a heated tank wall. The mirror directs additional sunlight through the transparent covering to the steel plate. The heat energy in the steel plate is conducted through the copper tubes into the water. In addition, the transparent covering produces a "hothouse" effect by trapping the heated air beneath the transparent covering.

36 Claims, 5 Drawing Figures

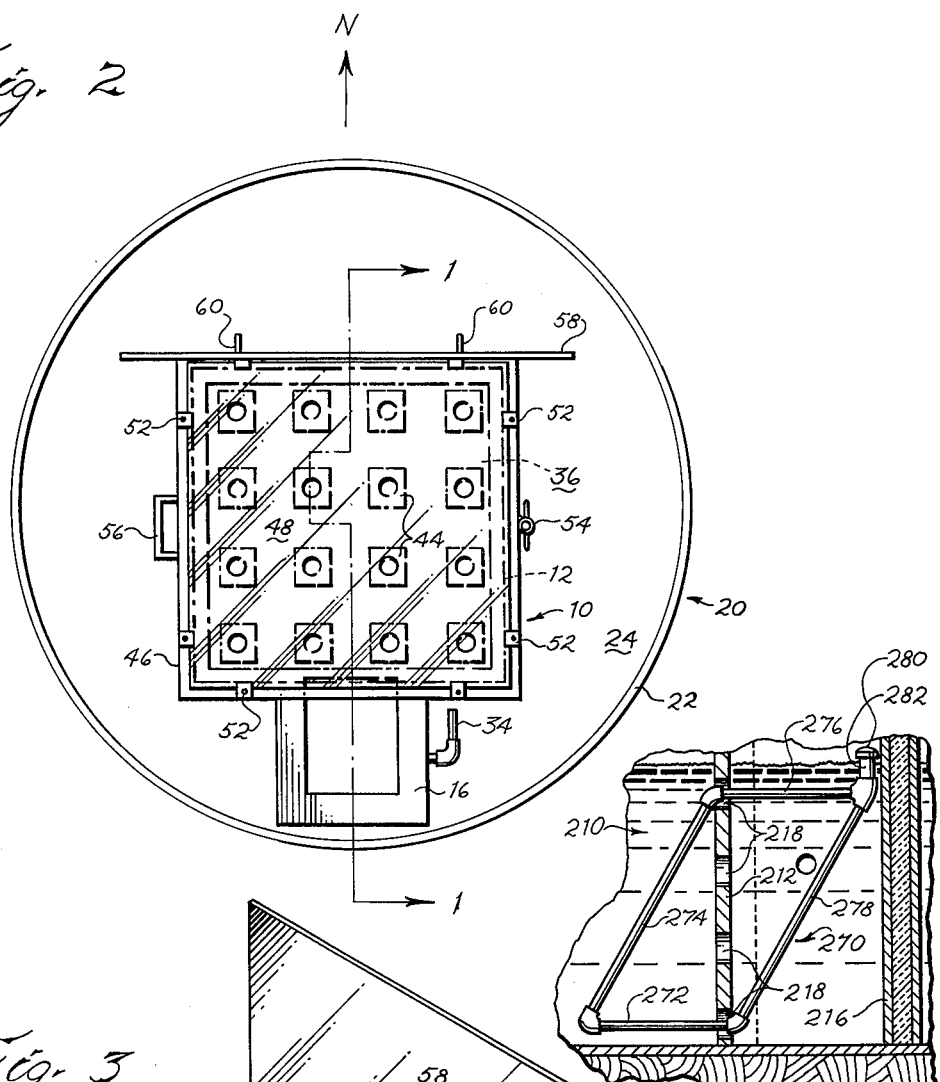
Fig. 2
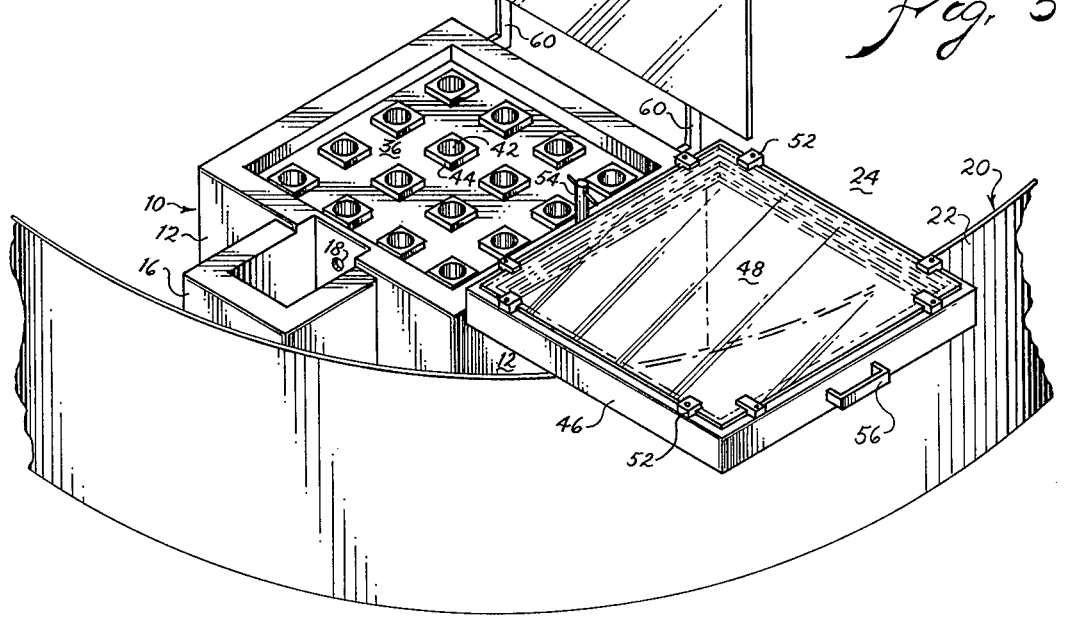
Fig. 3
Fig. 5

SOLAR-HEATED STOCK TANK

CROSS-REFERENCE TO RELATED APPLICATIONS

None. However, applicant filed Disclosure Document No. 053997 on Nov. 8, 1976, which document concerns this application; therefore, by separate paper, it is respectfully requested that the document be retained.

BACKGROUND OF THE INVENTION

1. Field of the Invention

This invention relates to controlling temperatures in watering devices used in animal husbandry.

2. Description of the Prior Art

Maintaining watering tanks for livestock free of ice during cold seasons is a frequent problem for farmers and ranchers. The operator must break the sheet of ice formed in the water tanks to enable the livestock to drink. The problem is compounded when stock tanks are located at remote sites because of the inconvenience to the operator; also, remote tanks are often inaccessible during and after inclement weather.

Prior to my invention, workers in the field have suggested devices for heating stock tanks. However, none of these devices used solar energy to keep the water ice-free.

The following are prior art devices known to this applicant prior to filing this application:
  Sparber — U.S. Pat. No. 3,943,889
  Best — U.S. Pat. No. 3,768,264
  Martin — U.S. Pat. No. 3,745,977
  Baer — U.S. Pat. No. 3,618,569
  Rowekamp — U.S. Pat. No. 3,161,193
  Davis — U.S. Pat. No. 629,122

SUMMARY OF THE INVENTION

New and Different Function

I have solved this problem by inventing a stock tank that is kept ice-free by solar energy. Solar energy is a particularly appropriate form of energy because electric and other forms of energy are often not available at remote sites. In addition, solar energy is free and its use is ecologically desireable.

My invention maintains a stock tank free of ice by combining a "hothouse" effect achieved by placing a transparent covering over the stock tank with a solar absorptive-conductive system to transmit heat energy to the water within the tank. In addition, a mirror supplements the solar energy normally entering the tank volume with additional reflected sunlight.

This invention will work best at higher altitudes because the atmosphere absorbs less of the available sunlight energy at higher altitudes. However, this is consistent with the functioning of this invention because average temperatures tend to lower and evaporation cooling higher in the higher altitudes. I.e., the invention naturally compensates for differences in temperatures at various altitudes.

An apparent disadvantage of this invention is that it only functions during periods of sunlight. However, the disadvantages of using solar energy are far outweighed by the advantages.

First, in order to justify the cost of the invention, it is contemplated that this invention will be used primarily in areas where the sitesfor stock tanks are relatively inaccessible or inconvenient. I.e., where the benefit of not having to manually break the ice outweighs the cost. It is noted that the majority of such situations are found in more arid areas which normally having a large number of days with sunlight.

Second, the sites of many stock tanks are so remote that it would be infeasible to provide electric or other forms of energy to run a "powered" de-icer. In addition, this invention may be moved from one large stock tank or site to another without costly investment in power transport lines for each new site.

Third, solar energy is economical, costing only the price of the equipment initially and requiring very minor maintenance. Therefore, significant savings may be realized by users of this invention in view of the current fuel shortages.

Fourth, the use of solar energy is one of the most ecologically desireable utilizations of energy today. My invention uses an abundant energy supply and produces no pollutants.

Fifth, my invention requires almost no maintenance. The operator of a ranch or farm may engage in profitable activity rather than expend time and energy traveling to and from a remote site to break the sheet of ice in a stock tank by hand. Therefore, it may be seen that these advantages of my invention greatly outweigh the disadvantage of only functioning during periods of sunlight.

Thus it may be seen that my invention accomplishes a function greater than the sum of the individual functions of the elements. My invention uses a free energy supply, requires almost no maintenance, is ecologically desireable, provides water for livestock, and maintains a water supply ice-free during cold periods.

Objects of the Invention

An object of this invention is to maintain stock tanks free of ice.

Further objects are to achieve the above with a device that is sturdy, compact, durable, lightweight, simple, safe, efficient, versatile, ecologically compatible, energy conserving, and reliable, yet inexpensive and easy to manufacture, install, adjust, and maintain.

Other objects are to achieve the above with a method that is versatile, ecologically compatible, energy conserving, rapid, efficient, and inexpensive, and does not require skilled people to install, adjust, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 2 is a top elevational view thereof.

FIG. 3 is a perspective view thereof, with the transparent covering in the open position.

FIG. 5 is a side sectional view of a portion of a third embodiment taken on a plane similar to FIG. 1.

DESCRIPTION OF THE PREFERRED EMBODIMENTS

Figure 1:
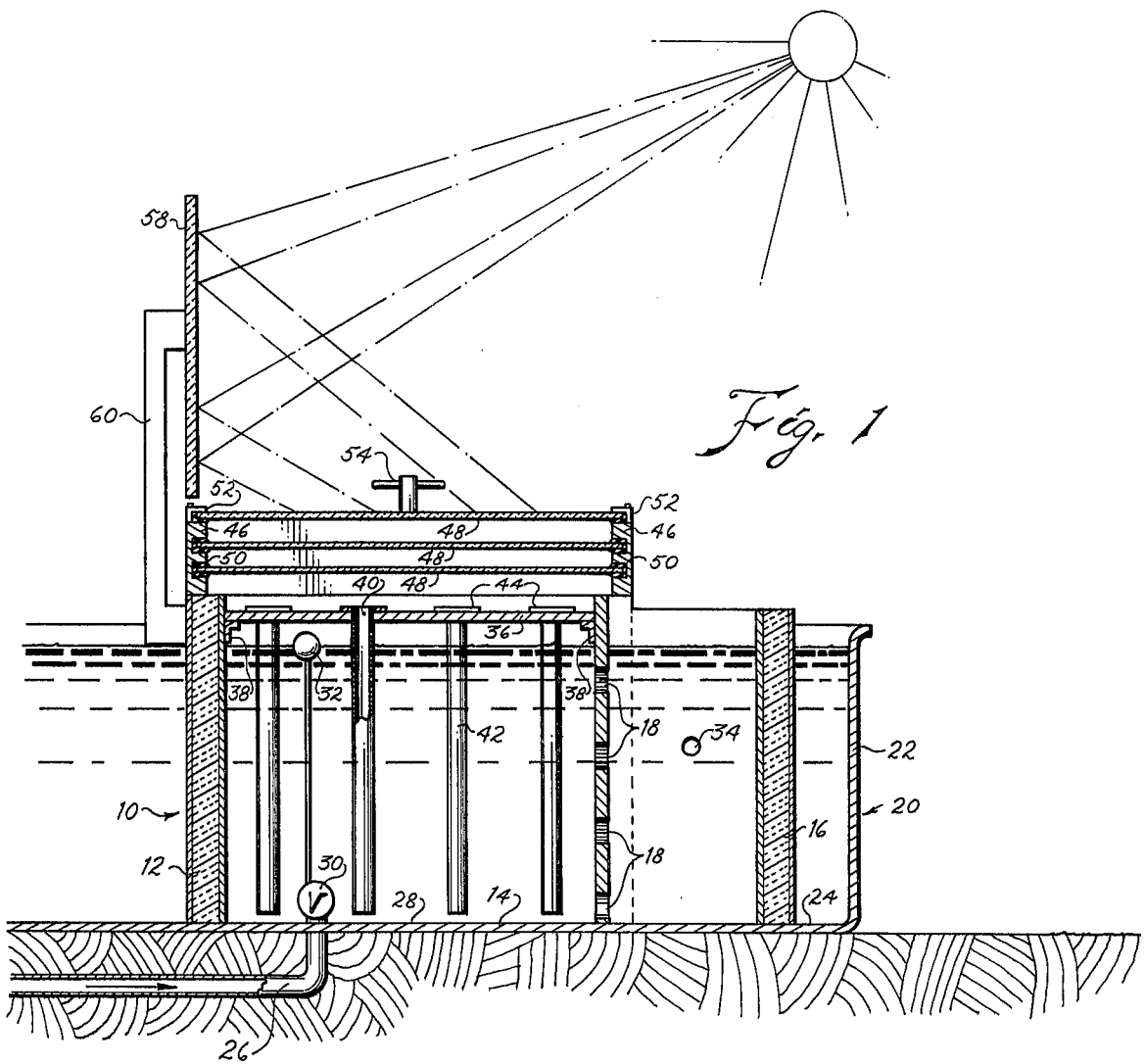
FIG. 1 is a side sectional view of an embodiment of this invention taken substantially on line 1—1 of FIG. 2.

Heated tank body 10 is comprised of insulated tank walls 12 and heated tank floor 14. Drinking vessel or insulated trough 16 is connected to the outside of one of the tank walls 12. Water supply openings 18 connect the interior of the heated tank body 10 with the interior of the insulated trough 16. I prefer to use a plurality of the water supply openings 18 so that a convection current will be formed, thereby constantly supplying the insulated trough 16 with heated water, as will be shown hereinafter.

Because some parts of the heated tank body 10 and its attachments will not withstand extended abuse, I prefer to protect it from the livestock by surrounding it with a larger tank body 20. The large tank body 20 is comprised of large tank wall 22 and large tank floor 24. The large tank body 20 is the watering tank normally on the site before the installation of my invention.

Water supply line 26 extends from the large tank floor 24 through a sealed floor aperture within the heated tank floor 14. Float valve 30 is located at the end of the water supply line 26. Float 32 is connected to the float valve 30 and regulates the water level within the large tank body 20.

Equalizing opening 34 connects the water within large tank body 20 with the water within the heated tank body 10, thereby preventing overflow of the heated tank body and equalizing the water level within the two tank bodies.

Therefore, I prefer to place the heated tank body 10 within the large tank body 20 such that the end of the water supply line 26 is within the heated tank body. In the event that the water within the large tank body 20 should be frozen, the heated tank body 10 will be assured of an adequate supply.

Absorptive plate 36 is located within the tank body 10 parallel-planar with and above the surface of the water within the tank body 10. The absorptive plate 36 is connected to the insulated tank walls 12 by plate braces 38. Tube holes 40 are located within the absorptive plate 36.

Conductive tubes 42 fit slidably within the tube holes 40 and extend into the water within the heated tank body 10. Each conductive tube 42 has a contact stop 44 on one end. The contact stop 44 is larger in diameter than the hole 40, and provides a means for preventing the conductive tube 42 from falling completely through the absorptive plate 36. In addition, the contact stop 44 provides more thermal contact between the absorptive plate 36 and the conductive tubes 42. The conductive tubes 42 are removable from the absorptive plate 36 and the heated tank body 10 for replacement or servicing.

Transparent covering 45 is comprised of a covering frame 46 and transparent glass plates 48 located within the covering frame 46. The covering frame 46 contacts and is coextensive with the top of the tank walls 12. The edges of the glass plates 48 approximately conform to the inner faces of the covering frame. The edges of all the glass plates 48, except the top one, fit within longitudinal grooves 50 in the inner faces of the covering frame 46. The top glass plate 48 is secured by plate clamps 52 on top of the covering frame 46. The plates 48 may be glazed to the frame 46.

The covering frame 46 is connected to one of the tank walls 12 by screw jack 54, which provides a means for lifting the covering frame 46 from the top of the tank walls 12. Screw jack 54 also serves as the pivot of a means to swing the covering frame 46 approximately 180° about the axis of the screw jack to a position not over the heated tank body 10, thereby providing access to the absorptive plate 36 and the conductive tubes 42. (FIG. 3). Handle 56 is located on the covering frame side opposite the side to which the screw jack 52 is attached. Handle 56 assists in moving the covering frame 46 about the screw jack 54.

Mirror 58 is attached to one of the tank walls 12 by mirror supports 60. The mirror 58 is vertically oriented such that sunlight will be directed through the transparent glass plates 48, and within the heated tank body 10. The mirror is placed on the north side of the tank body 10 as shown by arrow "N" of FIG. 2. I prefer to install the mirror 58 on the side of the heated tank body 10 most proximate the center of the larger tank body because this element of the invention may tend to attract livestock and hence subject to abuse. In addition, I prefer to place the mirror opposite the side of the heated tank body to which the insulated trough 16 is attached. I also prefer to attach the screw jack to the wall adjacent to the side to which the mirror is attached so that the mirror supports will not interfere with the movement of the covering frame 46.

When the above elements are combined in the manner specified, the following sequence of events may be seen to occur. Sunlight reflected by the mirror and sunlight normally incident to the area of the top glass plate in the transparent covering 45 passes through the glass plates 48 and impinges upon the absorptive plate 36. The temperature of the absorptive plate 36 rises because of the solar energy striking it. In addition, the transparent covering 45 with insulative spaces between the plural glass plates 48 prevents the heat energy in the air in contact with absorptive plate 36 from escaping by trapping the mass of air beneath the covering, thereby increasing the effective heating of the absorptive plate 36. It may be observed that the transparent covering 45 performs a function somewhat akin to a hothouse.

Heat energy within the absorption plate 36 is conducted to the contact stops 44 on the end of the conductive tubes 42 at the area at which the contact stops 44 contact the absorptive plate 36, thereby raising the temperature of the conductive tubes 42. The heat energy is then transferred to the water at the area of contact between the conductive tubes 42 and the water within the heated tank body 10, thereby heating the water.

I prefer to employ hollow cylindrical members for the conductive tubes 42, rather than solid members, for the following reasons. First, hollow tubes are less expensive than solid stock, expecially for highly conductive metals such as copper. Second, hollow tubes permit the use of larger cross-sectional diameters, with a corresponding increase in the surface area in contact with the water. Third, the use of hollow tubes effectively doubles the area of contact with the water because the inner surface of the tubes is also in contact with the water. Fourth, hollow tubes weigh less than solid members and are, therefore, more easily removed. I also prefer to employ steel metal for the absorptive plate 36 because of its combination of structural strength, conductivity, and heat capacity. I prefer to use copper metal for the conductive tubes 42 because of its superior conductive qualities and ability to dissipate heat to water.

It should be noted that the diameter of the conductive tubes may be varied either by simply enlarging the holes within the absorptive plate and welding larger contact stops 44 to the ends of the larger-diameter conductive tubes 42 or by inserting smaller tubes with contact stops wider than the tube holes. In addition, when the diameter of the tubes is enlarged, it may be beneficial to close the opening shown in the contact plate in FIG. 2 in order to maintain a sufficient surface area for absorption by the absorption plate 36 and contact stops 44.

It may be seen that the particular nature of this invention also facilitates the melting of an ice sheet, should one form, at the top of the water within the heated tank body 10. As the water is heated beneath the ice, the warmer water will tend to rise, and the colder water will tend to settle near the heated tank floor 14. Therefore, as the energy within the warmer water is transferred to the bottom of the ice sheet and the water is thereby cooled, it will settle to the bottom of the tank to be replaced by rising warmer water. In this manner, a convection current is established, thereby naturally circulating warm water to the ice sheet and eventually melting it. It may also be seen that a similar convection current will be established within the insulated trough 16 because warmer water will enter the insulated trough through the upper water supply openings 18, and colder water will exit through the lower water supply openings 18. In this way, ice in the insulated trough will be melted.

To those skilled in the art, it may be seen that in geographical areas in which the temperature gets very low, a sheet of ice may form in the trough in the first embodiment despite the fact that heat retained within the heated tank may prevent ice from forming under less severe temperatures. Although the ice in the insulated trough will eventually be melted as shown previously, the slab of ice in the trough may make it difficult for the livestock to drink.

Figure 4:
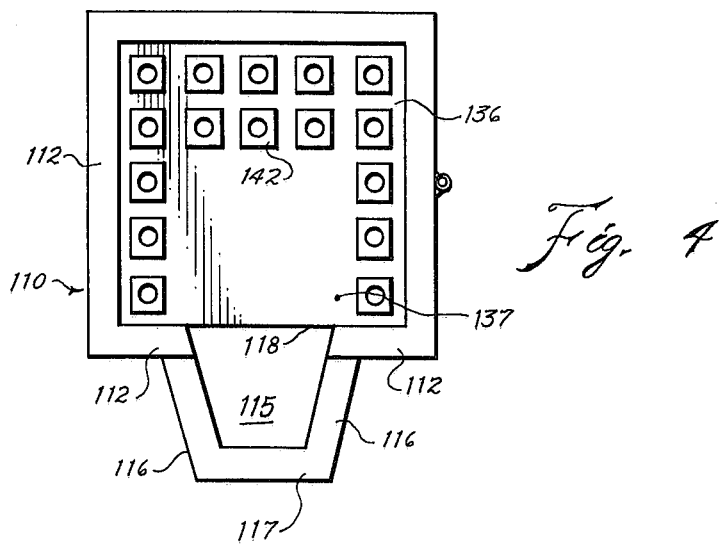
FIG. 4 is a top elevational view of a second embodiment of this invention without the larger tank or transparent covering.

The second embodiment shown in FIG. 4 solves this problem by providing gap 118 in heated tank wall 112 opposite the interior of drinking vessel or insulated trough 115. In addition, the insulated trough 115 has insulated trough sides 116 and insulated trough front 117. As shown in FIG. 4, the insulated trough front 117 is not as wide as the gap 118, and the insulated trough sides 116 are of equal length.

This "trapezoidal" shape allows the livestock to dislodge the slab of ice formed in the top of the insulated trough 115 and to push the slab within heated tank body 110. However, it may be seen that the conductive tubes 42 in the first embodiment would interfere with attempts to push the slab of ice within the tank body 10. Therefore in the second embodiment, conductive tubes 152 are located within absorptive plate 136 so as to form open space 137. It may be seen that the surface area beneath the open space 137 is greater than the surface area of the insulated trough 115, thereby providing a clear area into which the slab in the insulated trough may be pushed.

The third embodiment shown in FIG. 5 provides another solution to the problem of ice forming in drinking vessel or insulated trough 216. Closed tubular heating loop 270 includes a heat absorption portion and a heat dispersion portion. The heat absorption portion is formed by lower leg 272 and tank body leg 274. The heat dispersion portion is formed by upper leg 276 and trough leg 278.

As may be seen in FIG. 5, the heat absorption portion and heat dispersion portion are connected and pass through water supply openings 218 in tank wall 212. Filler cap 280 closes the end of filler tube 282 on the tubular loop 270. The filler tube 282 provides a means for filling the closed tubular loop 270 from heated tank body 210 to the insulated trough 216. I prefer to use copper tubing to make the closed heating loop 270.

Therefore it may be seen that the heat energy in the heated water in the heated tank body 210 will be absorbed by the liquid in the copper tubing in the heat absorption portion. The heated liquid will rise, forcing colder liquid within the heat dispersion portion to flow into the heat absorption portion, thereby creating a natural convection current within the closed tubular loop 270. The heat energy within the warmer liquid convected to the heat dispersion portion is conducted through the walls of the copper tubing to the ice in the top of the insulated trough 216, thereby melting it.

As an alternative, one of the upright legs 278 or 274 may be insulated to provide a convection current.

I prefer to use styrofoam to insulate the tank wall and to insulate the trough because styrofoam is water resistant, flexible, and durable. However, when employing styrofoam with this invention, care should be taken to insure that the weight of the heated tank bodies 10 and 110 are sufficient to keep the invention from floating within the large tank.

As an aid to correlating the terms of the claims to the exemplary drawing, the following catalog of elements is provided:

10 heated tank body
12 insulated tank walls
14 heated tank floor
16 drinking vessel
18 water supply openings
20 large tank body
22 large tank wall
24 large tank floor
26 water supply line
30 float valve
32 float
34 equalizing openings
36 absorptive plate
38 plate braces
40 tube holes
42 conductive tubes
44 contact stop
45 transparent covering
46 covering frame
48 glass plates
50 longitudinal grooves
52 plate clamps
54 screw jack
56 handle
58 mirror
60 mirror supports
110 heated tank body
112 insulated tank walls
115 drinking vessel
116 insulated trough side
117 insulated trough front
118 gap
136 absorptive plate
137 open space
142 conductive tubes
210 heated tank body
212 tank wall
216 drinking vessel
218 water supply openings
270 tubular loop 272 lower leg
274 tank body leg
276 upper leg
278 trough leg
280 filler cap
282 filler tube The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

I claim as my invention:

1. In a water tank for livestock having
   a. a tank body with
      (i) a tank floor and
      (ii) at least one insulated tank wall,
   b. said tank body enclosing a tank volume,
   c. water within said tank body,
   The method of maintaining a stock tank free of ice comprising in combination with the above:
   d. permitting sunlight to shine through a transparent covering, thereby
   e. heating the volume of air and water beneath said transparent covering, and
   f. retaining the heat energy within said volume by trapping said air beneath said transparent covering within said tank volume, thereby
   g. producing a "hothouse" effect within said tank volume, thereby
   h. heating said water to a temperature above that at which water freezes,
   j. conducting water from the tank body to a drinking vessel for livestock to drink from, and
   k. heating the water in the drinking vessel by convection heating from the tank body.

2. The invention as defined in claim 1 with additional limitations of p1 i. preventing cattle from damaging equipment used to practice the recited method by
   j. surrounding said equipment by water in a surrounding tank.

3. The invention as defined in claim 1 with additional limitations of
   i. increasing the energy to the tank volume by
   j. reflecting additional solar energy therein.

4. In a water tank for livestock having
   a. a tank body with
      (i) a tank floor, and
      (ii) at least one insulated tank wall,
   b. said tank body enclosing a tank volume,
   c. water within said tank body,
   The method of maintaining a stock tank free of ice comprising in combination with the above:
   d. allowing sunlight to impinge upon an absorptive member above said water, thereby
   e. heating said absorptive member, and
   f. conducting said heat energy to a conductive component immersed within said water, and
   g. conducting said heat energy from said conductive component to said water, thereby
   h. heating said water to a temperature above that at which water freezes,
   i. preventing cattle from damaging equipment used to practice the recited method by
   j. surrounding the equipment by water in a surrounding tank.

5. The invention as defined in claim 4 with additional limitations of
   i. increasing the energy to the tank volume by
   j. reflecting additional solar energy therein.

6. The invention as defined in claim 4 with additional limitations of
   i. permitting sunlight to shine through a transparent covering, thereby
   j. heating the volume of air and water beneath said transparent covering, and
   k. retaining the heat energy within said volume by trapping said air beneath said transparent covering within said tank volume, thereby
   m. producing a "hothouse" effect within said tank volume.

7. The invention as defined in claim 6 with additional limitations of
   n. providing access to the absorptive and conductive members by
   o. removing said transparent covering 8. In a water tank for livestock having
   a. a tank body with
      (i) a tank floor, and
      (ii) at least one insulated tank wall,
   b. said tank body enclosing a tank volume,
   c. water within said tank body,
   the solar water tank comprising in combination with the above:
   d. a transparent covering above the surface of the water within said tank body,
   e. said transparent covering providing means for admitting sunlight energy within said tank body below said transparent covering.
   f. said transparent covering also providing means for retaining said energy within said tank volume,
   g. a drinking vessel attached to said tank body,
   h. at least one water opening from said tank body to said drinking vessel,
   i. said drinking vessel being attached to the outside of said tank body such that it is not within said tank volume.

9. The invention as defined in claim 8 with additional limitations of
   g. a vertically oriented reflective surface connected to said tank wall,
   h. said reflective surface providing means for directing sunlight energy within said tank volume.

10. The invention as defined in claim 8 with additional limitations of
    g. said tank body being surrounded by a larger tank body,
    h. at least one water opening from said tank body to said larger tank body.

11. The invention as defined in claim 10 with an additional limitation of
    i. a water supply means for said larger tank being within said tank volume and extending from said larger tank body through an aperture within said tank floor.

12. The invention as defined in claim 8 with additional limitations of
    j. said transparent covering comprising:
       (i) a frame, and (ii) at least one transparent member within said frame,
k. said frame contacting and being coextensive with the top of said tank wall.

13. The invention as defined in claim 12 with an additional limitation of
l. said frame being removable.

14. The invention as defined in claim 12 with additional limitations of
l. at least two glass members within said frame,
m. said glass members having at least one air space therebetween,
n. said air space providing means for insulating said tank volume from air outside said tank volume.

15. The invention as defined in claim 14 with an additional limitation of
o. said frame being removable.

16. The invention as defined in claim 15 with additional limitations of
p. a vertically oriented reflective surface connected to said tank wall,
q. said reflective surface providing means for directing sunlight energy within said tank volume.

17. The invention as defined in claim 16 with additional limitations of
r. said tank body being surrounded by a larger tank body,
s. at least one water opening from said tank body to said larger tank body.

18. The invention as defined in claim 17 with an additional limitation of
t. a water supply means for said larger tank being within said tank volume and extending from said larger tank body through an aperture within said tank floor.

19. In a water tank for livestock having
a. a tank body with
(i) a tank floor, and
(ii) at least one insulated tank wall,
b. said tank body enclosing a tank volume,
c. water within said tank body,
the solar-heated water tank comprising in combination with the above:
d. a heating member,
e. said heating member having
(i) an absorptive component and
(ii) a conductive component,
f. said absorptive component being above the surface of the water within said tank body,
g. said absorptive component being exposed to sunlight,
h. said conductive component extending below the surface of the water within the tank body,
i. said heating member providing means for absorbing sunlight energy, and
j. said heating member providing means for transferring said energy to the water within said tank body,
k. said tank body being surrounded by a larger tank body,
l. at least one water opening from said tank body to said larger tank body.

20. The invention as defined in claim 19 with additional limitations of
k. a transparent covering above the surface of the water within said tank body,
l. said transparent covering providing means for admitting sunlight energy within said tank body below said transparent covering,
m. said transparent covering also providing means for retaining said energy within said tank volume.

21. The invention as defined in claim 19 with additional limitations of
k. a vertically oriented reflective surface connected to said tank wall,
l. said reflective surface providing means for directing sunlight energy within said tank volume.

22. The invention as defined in claim 19 wherein
k. said conductive component is at least one longitudinal member,
l. each of said longitudinal members is connected to and depends from said absorptive component.

23. The invention as defined in claim 19 with an additional limitation of
m. a water supply means for said larger tank being within said tank volume and extending from said larger tank body through an aperture within said tank floor.

24. The invention as defined in claim 19 wherein
k. said absorptive component is a planar sheet,
l. said conductive component depends from said absorptive component and is immersed in the water.

25. The invention as defined in claim 24 wherein
m. said conductive component is at least one longitudinal member,
n. each of said longitudinal members is connected to and depends from said absorptive component.

26. The invention as defined in claim 25 with additional limitations of
o. said absorptive planar sheet being connected to the tank walls and suspended above the water,
p. said planar absorptive sheet having holes therein,
q. said longitudinal members fitting slidably through said holes,
r. said longitudinal members having a plate on one end,
s. said plate being larger in width than said holes,
t. said plate having a planar surface in contact with said planar absorptive sheet,
u. said plate providing means for conducting heat energy from said planar absorptive sheet to said longitudinal members.

27. The invention as defined in claim 26 with additional limitations of
v. said longitudinal members being cylindrical tubes,
w. said longitudinal members being removable from said tank body and from said absorptive component.

28. The invention as defined in claim 26 with additional limitations of
v. a transparent covering above the surface of the water within said tank body,
w. said transparent covering providing means for admitting sunlight energy within said tank body below said transparent covering,
x. said transparent covering also providing means for retaining said energy within said tank volume.

29. The invention as defined in claim 28 with additional limitations of
y. a drinking vessel attached to said tank body,
z. at least one water opening from said tank body to said drinking vessel,
aa. said drinking vessel being attached to the outside of said tank body such that it is not within said tank volume.

30. The invention as defined in claim 29 with additional limitations of bb. said transparent covering comprising:
  (i) a frame, and
  (ii) at least one transparent member within said frame,
cc. said frame contacting and being coextensive with the top of said tank wall.

31. The invention as defined in claim 30 with additional limitations of
dd. at least two glass members within said frame,
ee. said glass members having an air space therebetween,
ff. said air space providing means for insulating said tank volume from air outside said tank volume.

32. The invention as defined in claim 31 with an additional limitation of
gg. said frame being removable.

33. The invention as defined in claim 32 with additional limitations of p1 hh. said longitudinal members being cylindrical tubes,
ii. said longitudinal members being removable from said tank body and from said absorptive component.

34. The invention as defined in claim 33 with additional limitations of
jj. a vertically oriented reflective surface connected to said tank wall,
kk. said reflective surface providing means for directing sunlight energy within said tank volume.

35. The invention as defined in claim 8 with additional limitations of
j. a closed tubular loop extending from the tank body to the drinking vessel, and
k. liquid in the loop whereby the drinking vessel is heated by the convection circulation of the liquid.

36. The invention as defined in claim 29, with additional limitations of
bb. a closed tubular loop extending from the tank body to the drinking vessel, and
cc. liquid in the loop whereby the drinking vessel is heated by the convection circulation of the liquid.

* * * * *